(12) United States Patent
Lin et al.

(10) Patent No.: US 6,775,156 B1
(45) Date of Patent: Aug. 10, 2004

(54) POWER LIMITATION TRANSFORMER CIRCUIT STRUCTURE OF POWER SUPPLY

(75) Inventors: Chiao-Hsin Lin, Taipei (TW); Kuo-Cheng Chu, Taipei (TW); Chih-Kuo Chou, Taipei (TW); Chih-Tarng Chuang, Taipei (TW)

(73) Assignee: Compal Electronics Inc., Taipei (TW)

( * ) Notice: Subject to any disclaimer, the term of this patent is extended or adjusted under 35 U.S.C. 154(b) by 0 days.

(21) Appl. No.: 10/408,561

(22) Filed: Apr. 8, 2003

(51) Int. Cl.[7] ............................................. H02M 3/335
(52) U.S. Cl. ...................................... 363/21.01; 363/97
(58) Field of Search ................................ 363/20, 21.01, 363/79, 95, 97

(56) References Cited

U.S. PATENT DOCUMENTS

| | | | |
|---|---|---|---|
| 5,969,962 A | * 10/1999 | Gabor | 363/89 |
| 5,982,642 A | * 11/1999 | Herfurth | 363/21.08 |
| 6,072,302 A | * 6/2000 | Underwood et al. | 322/17 |
| 6,169,669 B1 | * 1/2001 | Choudhury | 363/37 |
| 6,191,676 B1 | * 2/2001 | Gabor | 336/160 |

* cited by examiner

*Primary Examiner*—Adolf Berhane
(74) *Attorney, Agent, or Firm*—Bacon & Thomas PLLC

(57) ABSTRACT

Power limitation transformer circuit structure of power supply, including: an electromagnetic interference filter unit, a rectifying unit, a power factor correction section, a transformer having a primary input terminal and secondary input terminal, a pulse controlling unit connected with the secondary input terminal of the transformer, a primary power limitation circuit and at least one secondary power limitation circuit, an output current controlling unit and an output voltage controlling unit. The input terminal of the output current controlling unit is connected with the secondary output terminal of the transformer. The primary output terminal and secondary output terminal of the output current controlling unit are respectively serially connected with the primary and secondary power limitation circuits. The input terminal of the output voltage controlling unit is connected with the secondary output terminal of the transformer. The output terminal of the output voltage controlling unit is connected with the secondary power limitation circuit for controlling the magnitude of the voltage and current of the primary and secondary power limitation circuits so as to control the output power.

7 Claims, 3 Drawing Sheets

US 6,775,156 B1

POWER LIMITATION TRANSFORMER CIRCUIT STRUCTURE OF POWER SUPPLY

BACKGROUND OF THE INVENTION

The present invention is related to a power limitation transformer circuit structure of power supply, which is able to maintain a nominal output power of a power supply, while meeting the relevant international safety regulation so as to ensure safety in use.

Due to advanced technologies, the manufacturing cost for electric products such as notebook-type computers, PDA and mobile phones is rapidly lowered. However, a short circuit or override of the power supply of such electric product may take place due to mis-operation or old circuit. Such circumstance may lead to a fire. Accordingly, it is recommended by specialists that a user unplug the plug of the electric product when not used. However, the electric products such as computer systems and internet systems are often kept in an always on state so that the short circuit still may happen. Moreover, it is known that it is necessary to radiate the heat generated by the electric product so as to protect the parts thereof from being damaged. Accordingly, the housing of the electric product is generally formed with heat-radiating slots and heat-radiating plates and/or a heat-radiating fan is added to the electric product for quickly dissipating the heat. The larger the size of the heat-radiating slot is, the better the heat-radiating effect is. However, in the case that the heat-radiating slot has too large size, alien articles may get into the electric product to lead to short circuit or malfunction thereof.

In order to avoid the above problem, IEC regulates a safety specification standard in which it is regulated that the width of the heat-radiating slot should not exceed 1 mm. In the case that the output power of the power supply is not over 100 W, the limitation of the width of the heat-radiating slot is negligible.

Most of the housings of the electric products such as portable computers are made of plastic materials. Therefore, in the case that the width of the heat-radiating slot is limited to be smaller than 1 mm, by means of the existent injection molding technique, it is very hard to manufacture the housing with so small heat-radiating slots.

With respect to the second situation, the output power of the power supply is limited to be less than 100 W. This can be hardly achieved in relevant computer products which will consume more than 100 W power due to increased accessory equipment.

Therefore, it is necessary to provide a measure which can ensure safety in use of electric products, while maintaining a nominal output power.

SUMMARY OF THE INVENTION

It is therefore a primary object of the present invention to provide a power limitation transformer circuit structure of power supply, which is able to maintain a nominal output power of a power supply, while meeting the relevant international safety regulation so as to ensure safety in use.

It is a further object of the present invention to provide the above power limitation transformer circuit structure of power supply, which meets the relevant safety regulation or standard without lowering the ratio of good products or increasing the manufacturing cost.

It is still a further object of the present invention to provide the above power limitation transformer circuit structure of power supply, in which the output power of the power supply is limited to be within a safety value. Therefore, in case of short circuit or override, no spark is generated so as to ensure safety.

It is still a further object of the present invention to provide the above power limitation transformer circuit structure of power by which the housing of the electric product can be made of plastic material with lower fireproof degree. Therefore, the processing is facilitated and the cost for the material and the production is lowered.

It is still a further object of the present invention to provide the above power limitation transformer circuit structure of power in which the thickness of the housing of the electric product can be reduced (for the fireproof degree is lowered) so that the accommodating space of the housing is enlarged. Therefore, the standard parts can be used instead of those parts with special size. Accordingly, the cost is further reduced.

The present invention can be best understood through the following description and accompanying drawings wherein:

DETAILED DESCRIPTION OF THE PREFERRED EMBODIMENT

Figure 1:
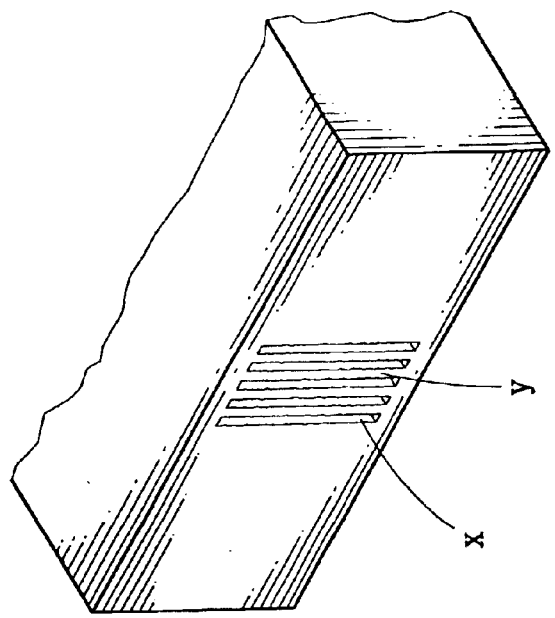
FIG. 1 is a perspective view showing the heat-radiating slots of the conventional housing of an electric product.

Please refer to FIG. 1 which shows a heat-radiating slot structure, wherein the width of the heat-radiating slot is denoted by "x" and the pitch between the heat-radiating slots is denoted by "y". According to the existent safety specification standard of IEC, the width x must be smaller than 1 mm. However, most of the housings of the electric products such as portable computers are made of plastic materials. Therefore, by means of the ordinary injection molding technique, it is very hard to manufacture the structure with the width of the heat-radiating slot smaller than 1 mm.

Figure 2:
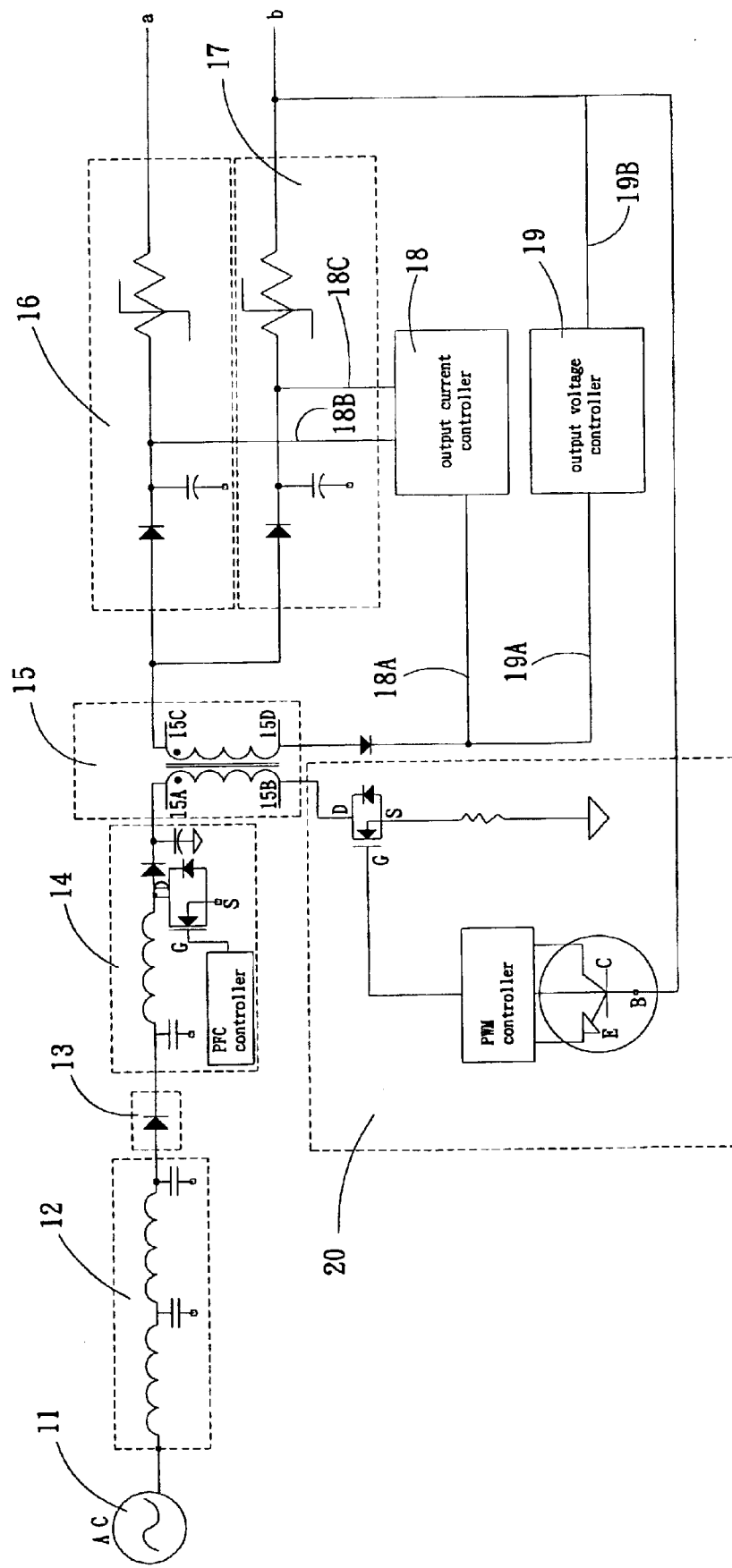
FIG. 2 is a circuit diagram of a preferred embodiment of the present invention.
Figure 3:
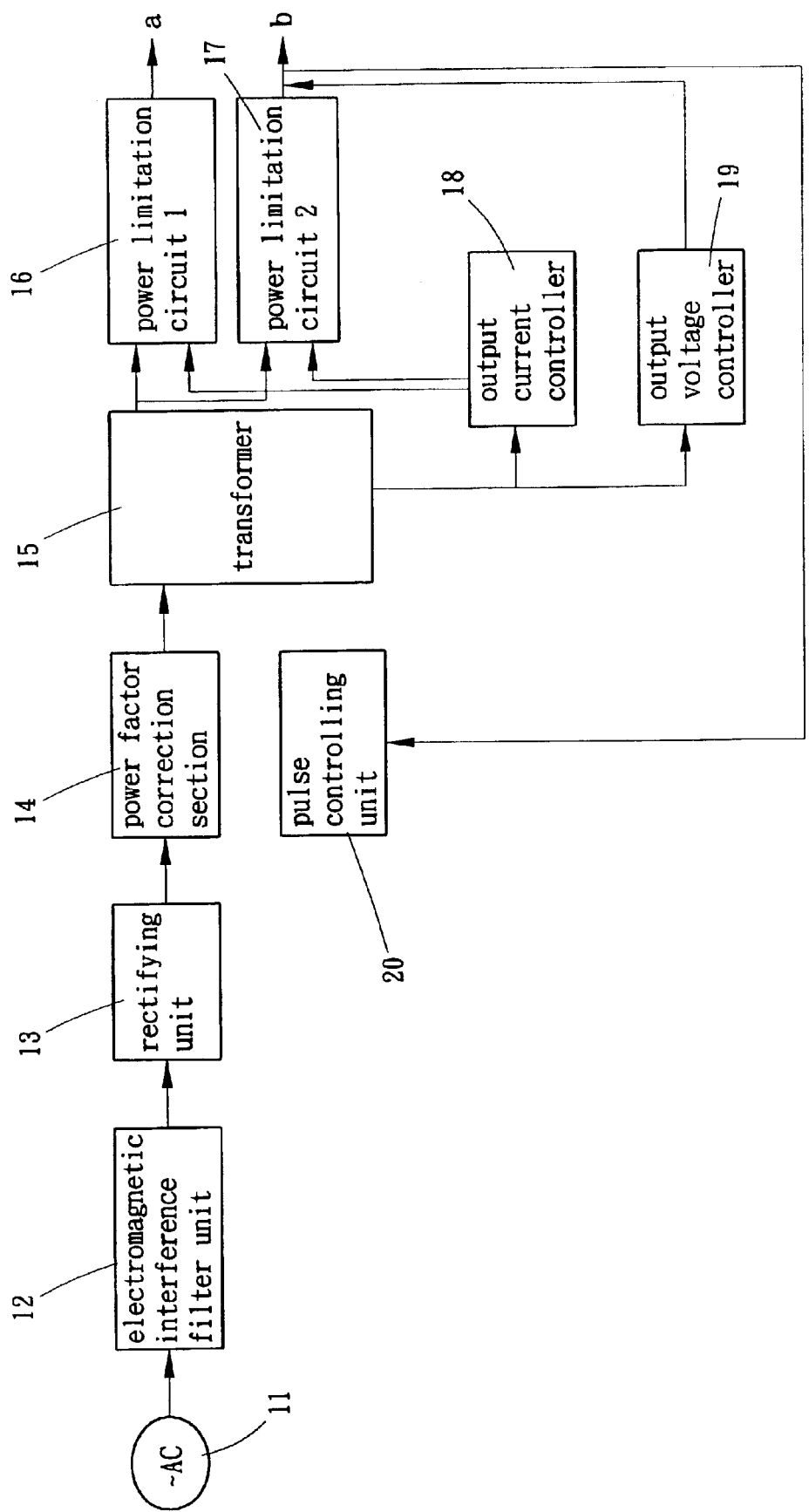
FIG. 3 is a block diagram of the preferred embodiment of the present invention.

Please refer to FIGS. 2 and 3. The power limitation transformer circuit of power supply of the present invention includes: an electromagnetic interference filter unit 12 as the input terminal of a power supply 11 for eliminating or suppressing low-frequency noise of the power supply 11; a rectifying unit 13, in a preferred embodiment, the rectifying unit including at least one bridge diode 131 connected with the electromagnetic interference filter unit 12 for rectifying the A.C. current passing through the electromagnetic interference filter unit 12, that is, converting the A.C. current into D.C. current; a power factor correction section 14 connected with the bridge diode 131 for enhancing the rectified voltage level; a transformer 15 having a primary order and a secondary order, the primary order having a primary input terminal 15A and at least one secondary input terminal 15B, the primary input terminal 15A being connected with the power factor correction section 14 for inputting power; at least one pulse controlling unit 20 connected with the secondary input terminal 15B, according to the magnitude of the output voltage or current, the pulse controlling unit 20 varying the width of the pulse work period so as to adjust on/off frequency of the primary terminal of the transformer and further affect the frequency of the output voltage or current, the secondary order of the transformer 15 having a primary output terminal 15C and at least one secondary output terminal 15D; a primary power limitation circuit 16 and at least one secondary power limitation circuit 17 connected with the primary output terminal 15C of the transformer 15 for filtering and detecting the current; and at least one output current controlling unit 18 having an input terminal 18A and a primary output terminal 18B and at least one secondary output terminal 18C. The input terminal 18A of the output current controlling unit 18 is connected with the secondary output terminal 15D of the transformer 15 for obtaining power. The primary output terminal 18B and secondary output terminal 18C of the output current controlling unit 18 are respectively serially connected with the primary power limitation circuit 16 and secondary power limitation circuit 17 for controlling the current magnitude thereof.

The present invention further includes at least one output voltage controlling unit 19 having an input terminal 19A and an output terminal 19B. The input terminal 19A of the output voltage controlling unit 19 is connected with the secondary output terminal 15D of the transformer 15 for obtaining power. The output terminal 19B is parallelly connected with the secondary power limitation circuit 17 for controlling the voltage magnitude thereof.

Accordingly, the magnitudes of the current and voltage of the primary power limitation circuit 16 and secondary power limitation circuit 17 so as to control the output power to a nominal value meeting the safety specification standard (IEC 60950) regulated by IEC, that is, a power less than 100 W. Under such circumstance, the size of the heat-radiating slot is not limited. In addition, the total of the output power of the primary power limitation circuit 16 and secondary power limitation circuit 17 can still satisfy the consumption of the electric product in actual application.

In conclusion, the power limitation transformer circuit of power supply of the present invention can provide sufficient output power for an electric product to use, while meeting the safety standard. The limitation of the design of heat-radiating slot is eliminated so that the fireproof degree of the housing is lowered and the accommodating space for the parts is enlarged. Also, the manufacturing cost is lowered.

The above embodiment is only used to illustrate the present invention, not intended to limit the scope thereof. Many modifications of the above embodiment can be made without departing from the spirit of the present invention.

What is claimed is:

1. Power limitation transformer circuit structure of power supply, comprising:

an electromagnetic interference filter unit serving as an input terminal of a power supply for eliminating or suppressing low-frequency noise of the power supply;

a rectifying unit connected with the electromagnetic interference filter unit for rectifying A.C. current passing through the electromagnetic interference filter unit;

a power factor correction section connected with the rectifying unit for enhancing the rectified voltage level;

a transformer having at least one primary input terminal and at least one secondary input terminal and at least one primary output terminal and at least one secondary output terminal, the primary input terminal of the transformer being connected with the power factor correction section for inputting power;

a pulse controlling unit connected with the secondary input terminal of the transformer, according to the magnitude of the output voltage or current of the power limitation transformer circuit structure of the power supply, the pulse controlling unit varying the width of the pulse work period so as to adjust on/off frequency of the primary terminal of the transformer;

a primary power limitation circuit and at least one secondary power limitation circuit connected with the primary output terminal of the transformer for filtering the current;

an output current controlling unit having an input terminal and a primary output terminal and at least one secondary output terminal, the input terminal of the output current controlling unit being connected with the secondary output terminal of the transformer for obtaining power, the primary output terminal and secondary output terminal of the output current controlling unit being respectively serially connected with the primary power limitation circuit and secondary power limitation circuit for controlling the current magnitude thereof; and an output voltage controlling unit having an input terminal and at least one output terminal, the input terminal of the output voltage controlling unit being connected with the secondary output terminal of the transformer for obtaining power, the output terminal being parallelly connected with the primary power limitation circuit and the secondary power limitation circuit for controlling the voltage magnitude thereof.

2. Power limitation transformer circuit structure of power supply as claimed in claim 1, wherein the transformer has one primary input terminal, one secondary input terminal, one primary output terminal and one secondary output terminal.

3. Power limitation transformer circuit structure of power supply as claimed in claim 1, wherein the Power limitation transformer circuit structure has one secondary power limitation circuit.

4. Power limitation transformer circuit structure of power supply as claimed in claim 1, wherein output current controlling unit has one input terminal, one primary output terminal and one secondary output terminal.

5. Power limitation transformer circuit structure of power supply as claimed in claim 1, wherein output voltage controlling unit has one input terminal and one output terminal.

6. Power limitation transformer circuit structure of power supply as claimed in claim 1, wherein the rectifying unit includes at least one rectifying element.

7. Power limitation transformer circuit structure of power supply as claimed in claim 6, wherein the rectifying element is a bridge diode.

* * * * *